US008555346B2

(12) United States Patent
Bokor et al.

(10) Patent No.: US 8,555,346 B2
(45) Date of Patent: Oct. 8, 2013

(54) GENERATING USER AND AVATAR SPECIFIC CONTENT IN A VIRTUAL WORLD

(75) Inventors: Brian Ronald Bokor, Raleigh, NC (US); Peter Frederick Haggar, Raleigh, NC (US); Daniel Edward House, Raleigh, NC (US); William Bruce Nicol, II, Durham, NC (US); Andrew Bryan Smith, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 12/193,836

(22) Filed: Aug. 19, 2008

(65) Prior Publication Data

US 2010/0050237 A1    Feb. 25, 2010

(51) Int. Cl.
*H04L 29/00* (2006.01)

(52) U.S. Cl.
USPC .............. 726/4; 726/27; 713/155; 713/156; 713/157; 713/158; 713/159

(58) Field of Classification Search
None
See application file for complete search history.

(56) References Cited

U.S. PATENT DOCUMENTS

| 5,956,038 | A  | * | 9/1999  | Rekimoto ........................ 345/419 |
| 7,073,129 | B1 | * | 7/2006  | Robarts et al. .................. 715/740 |
| 2001/0044725 | A1 | * | 11/2001 | Matsuda et al. ................ 704/269 |
| 2007/0113181 | A1 | * | 5/2007  | Blattner et al. ................. 715/706 |

* cited by examiner

*Primary Examiner* — Ghazal Shehni
(74) *Attorney, Agent, or Firm* — Moore & Van Allen PLLC (57) ABSTRACT

Generation of user and avatar specific content in a virtual world may include generating a local attribute object. The local attribute object may comprise attributes identifying at least one of the user's real world location and the user's avatar's virtual world location. Access to the local attribute object by virtual world operators may be controlled by the user and/or user's avatar. Specific content, based on the local attribute object, is presented to the user's avatar.

21 Claims, 3 Drawing Sheets

GENERATING USER AND AVATAR SPECIFIC CONTENT IN A VIRTUAL WORLD

BACKGROUND OF THE INVENTION

The present invention relates to simulations, virtual world simulations of the real world or real life or a virtual world and the like, and more particularly to a system and method for enabling generation of user and avatar specific content by a virtual space operator.

Computer based real-world simulations are becoming more ubiquitous. Simulations may be used for training purposes, for entertainment or for other purposes. Computer simulations such as Second Life™ or similar simulations present a virtual world which allows users or players to be represented by characters known as avatars. Second Life is a trademark of Linden Research, Inc. in the United States, other countries or both. Second Life is an Internet-based virtual world launched in 2003 by Linden Research, Inc. A downloadable client program called the Second Life Viewer enables users, called "Residents", to interact with others in the virtual world through motional avatars. The virtual world basically simulates the real world or environment. The users or residents via their avatar can explore the virtual world, meet other users or residents, socialize, participate in individual and group activities, and/or create and trade items (virtual property) and services from one another.

BRIEF SUMMARY OF THE INVENTION

In accordance with an aspect of the present invention, a method for enabling generation of user and avatar specific content in a virtual world may include generating a local attribute object associated with the user's avatar in the virtual world. The method may further include allowing access by a virtual world service provider to the local attribute object in response to the user's avatar entering the service provider's virtual world space and/or the service provider being authorized to access the avatar's associated local attribute object. The method may additionally include presenting user and avatar specific content to the user's avatar based on the local attribute object.

In accordance with another aspect of the present invention, a method for enabling generation of user and avatar specific content in a virtual world may include generating a local attribute object comprising a set of geographic location attributes identifying the user's real-world location and/or the user's avatar's virtual world location. The method may also include a local attribute object comprising a set of attributes of the user and/or the user's avatar.

In accordance with another aspect of the present invention, a method for enabling generation of user and avatar specific content in a virtual world may include presenting the specific content to the user's avatar by a local service component, wherein the specific content is based on the attributes in the local attribute object. In a further aspect of the invention, a method for enabling generation of user and avatar specific content by a virtual space operator in a virtual world may include allowing access to the local attribute object by a local service component associated with the service provider.

In accordance with yet another aspect of the present invention, a system for enabling generation of user and avatar specific content in a virtual world may include a processor and a module for enabling generation of user and avatar specific content by a virtual space operator in a virtual world operable on a processor. The module may generate a local attribute object associated with the user's avatar in the virtual world, wherein the module allows access to the local attribute object by a service provider and wherein the module presents to the user's avatar specific content based on the local attribute object.

In accordance with yet another aspect of the present invention, a computer program product for enabling generation of user and avatar specific content in a virtual world may include a computer usable medium having computer usable program code embodied therein. The computer usable medium may include computer usable program code configured to generate a local attribute object. The computer usable medium may further include computer usable program code configured to allow access to the local attribute object by a service provider. The computer usable medium may still further include computer usable program code configured to present to the user's avatar specific content based on the local attribute object.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
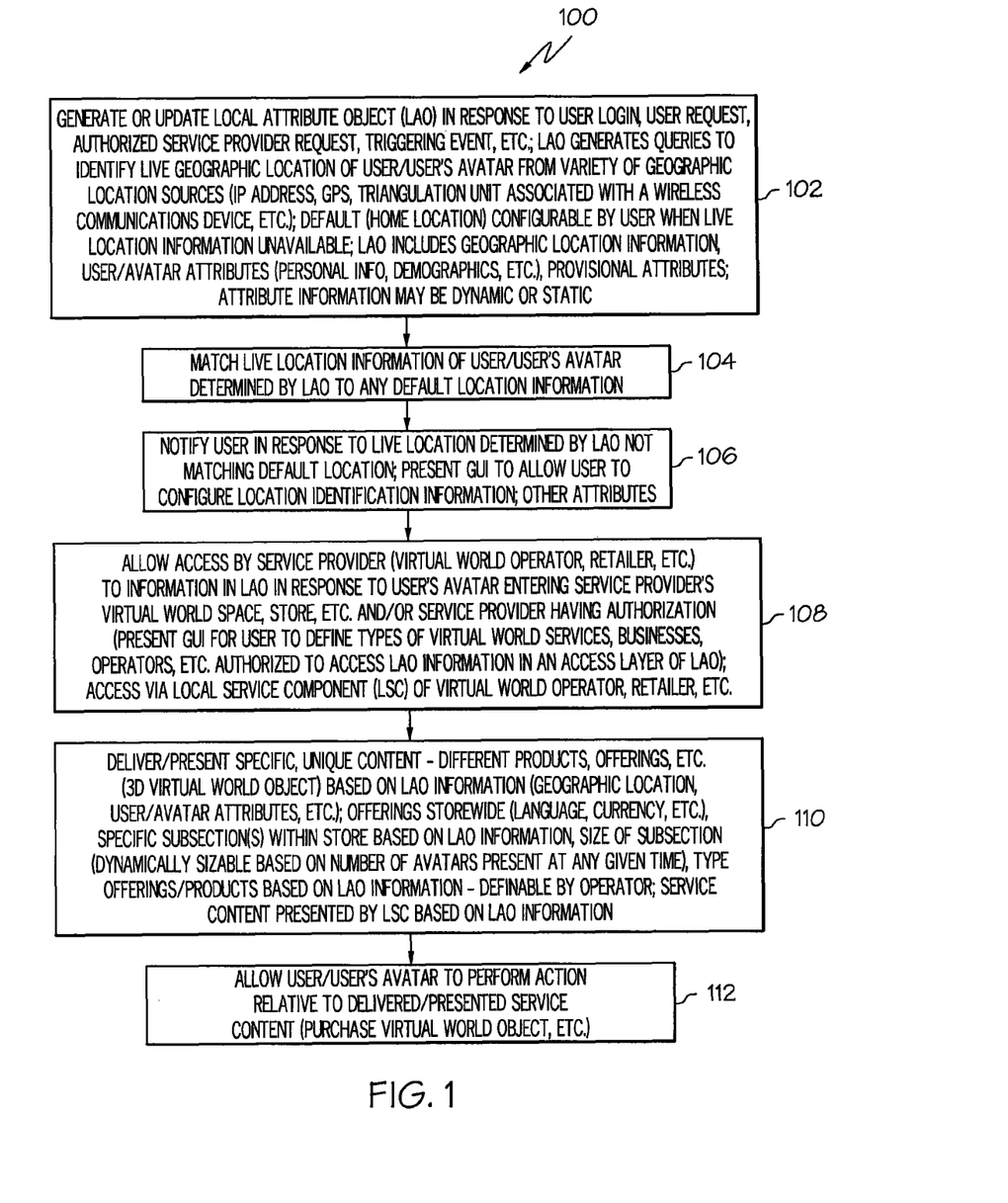
FIG. 1 is a flow chart of an example of a method for generating user and avatar specific content in a virtual world in accordance with an aspect of the present invention.

FIG. 1 is a flow chart of an example of a method 100 for generating user and avatar specific content in a virtual world in accordance with an embodiment of the present invention. In block 102, a local attribute object (LAO) may be generated in response to a user logging in to the virtual world, a user requesting to generate a LAO, an authorized service provider requesting a LAO associated with a user or user's avatar, an authorized service provider automatically receiving a LAO based on a user or user's avatar's location, or other triggering event in the virtual world. The LAO may include a set of geographic location attributes identifying the user's real-world location and/or user's avatar's virtual world location. The LAO may further optionally or selectively include a set of any other attributes of the user and/or the user's avatar as described herein. The service provider may provide the option of permitting other attributes to be included in the LAO or may provide an option for a user to selectively include other attributes in addition to geographic attributes in the LAO. The LAO may generate queries to identify a live, real-time geographic location of the user and/or user's avatar from a variety of geographic location sources or may be comprised of geographic location information configured by the user and/or user's avatar.

The LAO may contain a default home location configurable by the user and/or user's avatar, to be used when live, real-time geographic location information is unavailable. The LAO may further include other attributes provided by the user and/or user's avatar such as demographics or personal information. Still further, the LAO may include provisional attributes, which are temporary attributes configurable by the user and/or the user's avatar. Provisional attributes may be utilized when a user and/or user's avatar wishes to temporarily override the information provided by the geographic location attributes and/or any other attributes.

The attributes of the user and/or user's avatar may be any characteristic, quality, feature or any other aspect associated with the user or user's avatar. Examples of user or user's avatar attributes may include any geographic location information, such as the user's internet protocol (IP) address, coordinates from a global positioning system, coordinates from a triangulation unit associated with a wireless communications device, zip code, city, county, state, region, and/or country. Examples of user and/or user's avatar attributes may further include basic attributes or demographic attributes, such as gender, age, race, ethnicity, religion, occupation, or any other similar details about the user and/or user's avatar. Other examples of avatar attributes may include situational attributes, such as the avatar's current mood, the avatar's past mood swings and patterns, locations the avatar has visited, events that the avatar has attended, buying habits, the number of friends, friends the avatar has visited and other similar situational information associated with the avatar. One or more attributes may be determined by querying the user's avatar, the user, the avatar's profile, a database of avatar attributes, the LAO or other possible locations where the attributes may be found. One or more attributes associated with the user's avatar may be obtained in response to the query. Although the attributes may be determined by automatically generating a query, the attributes may also be determined by any other means, such as by the user and/or the user's avatar automatically or manually transmitting the attributes, observing and/or analyzing the user's avatar based on the user's avatar's actions, accessing a previous query of the user's avatar, or other similar determination means.

Attributes comprising the LAO may be static and comprised of information entered by the user and/or the user's avatar that does not change until and unless the user and/or user's avatar changes it. Static attributes may include geographic location information such as, but not limited to, zip code, city, county, state, region, or country. Static attributes may also include any information entered by the user or the user's avatar such as gender, age, race, ethnicity, religion, user and/or avatar occupation, or any other similar details about the user and/or user's avatar Attributes may be dynamic and comprised of information detected in real time, or automatically, upon the occurrence of a defined trigger or triggering event, such as user log in, user request, authorized service provider request, or authorized service provider automatically receiving information based on a user or user's avatar's location. Automatically detected information may be comprised of information from sources such as, but not limited to, the user's internet protocol (IP) address, coordinates received from a global positioning system (GPS), coordinates received from a triangulation unit associated with a wireless communications device, or electronic feed from a weather station, a clock and/or a calendar. In some embodiments, the LAO may be comprised of both static and dynamic attributes.

Attributes may be configured based on predefined parameters of other attributes present. For example, the presence of attributes defining location may automatically trigger creation of further attributes designating language and/or currency. Such attributes may also be manually entered. Language attributes may include English, Spanish, French, German, Italian, Russian, Chinese, Japanese, or any other known language or dialect thereof. Currency attributes may include the pound, dollar, yen, euro, or any other known currency. Further, a currency attribute may be specific to the virtual world, such as the "Linden dollar" sometimes used in Second Life™.

In block 104, the live, real-time geographic location information determined by LAO may be compared to the default location information to determine whether there is a match between the two. What constitutes a match may be defined by the user and/or the user's avatar.

In block 106, the user may be notified if live, real-time geographic location information determined by LAO does not match default location information. If there is a mismatch between the LAO determined location and the default location, the user may be presented with a graphical user interface (GUI) to allow the user to configure location identification information. The GUI may further enable the user to configure other attributes as well, such as personal information or provisional attributes. The GUI may still further enable the user to select the location at which the specific content is displayed.

In block 108, a virtual world operator, such as a retailer or service provider, may be allowed access to information in the LAO in response to the user's avatar entering the service provider's virtual world space and/or the service provider having authorization to access the LAO.

Proximity to the service provider's virtual world space may be defined by the service provider in order to determine when a user's avatar has entered the service provider's virtual world space. In block 108, a user's avatar may be detected to have entered a predefined proximity area in the virtual world. The predefined proximity area may be a two-dimensional or three-dimensional area in the virtual world extending a predefined distance in any direction from any location, event, store front, or any other virtual world area. The predefined proximity area may be predefined by any virtual world operator, such as the owner of a store, the host of an event, a person in charge of a location and/or service, or any other virtual world operator or virtual world service provider. The user's avatar may move into the predefined proximity area through actions of the user controlling the user's avatar, and/or the user may move his avatar such that the predefined proximity area encompasses the user's avatar.

Authorization of the service provider to access the LAO may be defined by the user. The user may be presented with a GUI to define types of virtual world operators authorized to access the LAO information in an access layer of the LAO. It is understood that there may be varying levels of access granted, corresponding to varying degrees of access to the information in the LAO, all of which may be defined by the user. The virtual world operator type may be defined by characteristics such as service provider virtual world location (i.e., Miami, Fla., U.S.A.), service provider name (i.e., Wal-Mart) and service provider type (i.e., discount department store). Access to the LAO by the virtual world operator is via a local service component (LSC) of the virtual world operator. An illustration of an example of a LSC accessing a LAO to provide a specific content or output will be described with reference to FIG. 3.

Once the user has authorized a service provider to access the LAO, the service provider may obtain information from the LAO in response to a triggering event. Triggering events may include the user's avatar entering the service provider's virtual world space, the user and/or user's avatar requesting an item or service provided by the service provider, or any other triggering events defined by the user and/or user's avatar. Note that once the service provider has been authorized to access the LAO, the service provider may then request information from the LAO or otherwise define ways of obtaining the information stored in the LAO.

Ways of obtaining the information stored in the LAO may include the service provider utilizing a "beacon" approach to track the user's and/or user's avatar's live, real-time geographic location. In this way, the service provider can receive a continuous input of information acquired by tracking the user's and/or user's avatar's location. If and when the user and/or user's avatar enters an area within a defined proximity of the service provider's location, the user and/or user's avatar's LAO is automatically provided to the service provider. Thus, the LAO may provide information to the service provider triggered by a "pull" (the service provider requests the information) or by a "push" (the LAO is automatically provided to the service provider in response to a triggering event).

In block 110, the virtual world operator may present or deliver specific, unique content to the user's avatar. The specific content may be based on LAO information. The specific content may be presented to the user's avatar by the local service component. The specific content may be at least one of products, services, and environmental characteristics of the service provider's virtual world space. Any of the types of specific content may be related of the attributes found in the LAO, according to the service provider's predefined parameters and configurations of attributes required for creation of particular content or output.

The product content or output may be presented in the form of a three dimensional item. The user's avatar may be able to manipulate the three dimensional item by picking it up, turning it around to examine all sides of it, etc. The product content may include any item pertinent to, or of particular relevance to, any attribute included in the LAO, such as geographic location-related attributes. Relevance to attributes is defined by the service provider. The product content may be, for example, weather related, related to season of the year, related to local athletic teams, or otherwise related in any way to the particulars of the situation as described in the attributes of the LAO.

The services content or output may be presented in the form of tickets, coupons, or vouchers for local musical or theatrical performances, local athletic events, restaurants selling local food specialties, local tourist attractions, or any other locally relevant event. The services content may further include anything pertinent to the locality, such as boat rentals in a location near a large body of water, or ski rentals in a snowy place in winter.

The environmental characteristics content or output may be comprised of currency, language, discount pricing, and configuration of the virtual world space. Examples of environmental characteristics of the service provider's virtual world space may include elements making up the virtual world space, features of a virtual world retail store, such as displays, automated avatars to assist the user's avatar or other features, language employed in the store, currency utilized in the store, and weather conditions outside the store. Configuration of the virtual world space may be dynamically adjusted according to a set of predetermined parameters. The predetermined parameters may be based on the number of avatars present in the virtual world space at a given time.

The specific content may be offered throughout the virtual world space, alongside other similar content offered in the virtual space, or in any other way the virtual space operator defines the configuration of the content in the virtual space. In one embodiment, the specific content may be offered in a specific subsection of the store wherein all offerings in the subsection are based on LAO information, or, in another embodiment, wherein all offerings in the subsection are based on geographic location attributes in the LAO.

The types of content may be based on LAO information and may be defined by the virtual world operator. The specific content may be presented by the LSC based on LAO information, wherein the LSC provides the logic and decision making functions that transform the LAO information input into specific content in the virtual world space.

In block 112, the user or user's avatar is allowed to perform an action relative to the specific content. The action performed may include purchasing the specific content.

Figure 2:
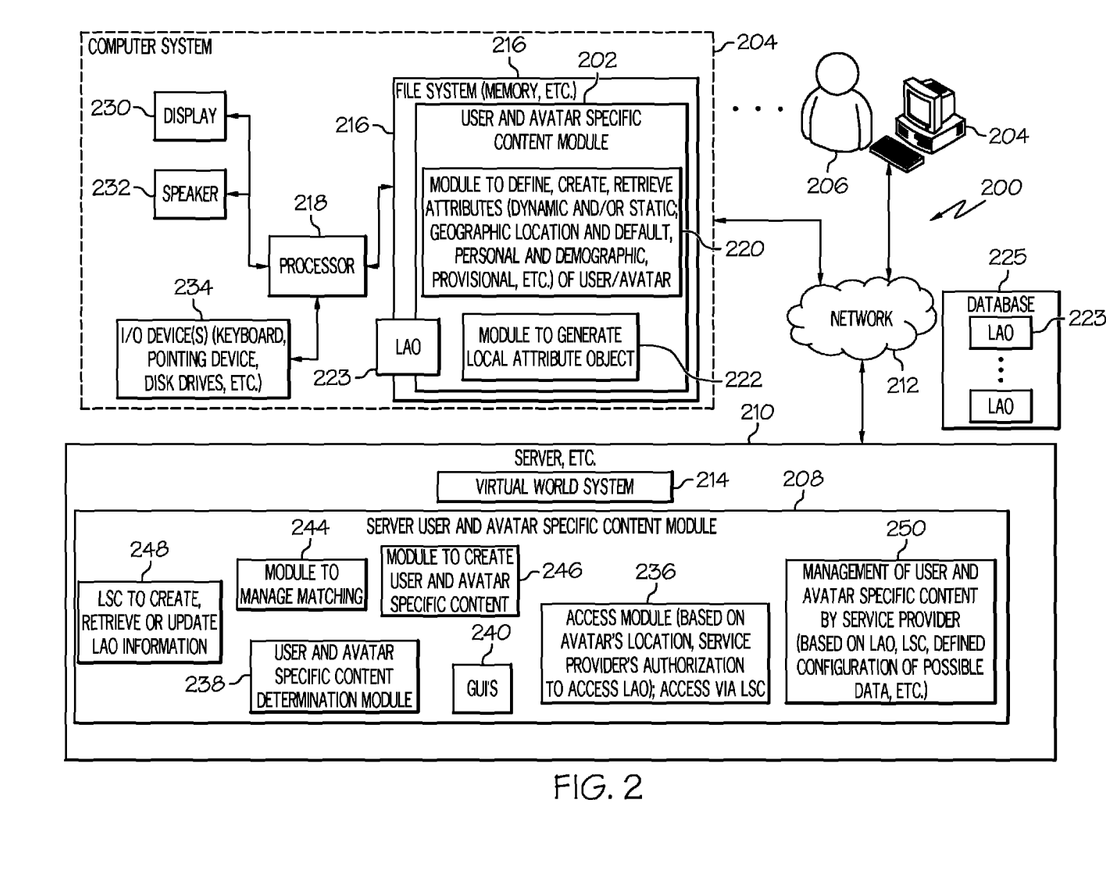
FIG. 2 is a block schematic diagram of an example of a system for generating user and avatar specific content in a virtual world in accordance with another aspect of the present invention.

FIG. 2 is a block schematic diagram of an example of a system 200 for generating user and avatar specific content, or output, in a virtual world in accordance with another embodiment of the present invention. The system 200 may include a module for generating user and avatar specific content in a virtual world (hereinafter "user and avatar specific content module") 202 operable on a computer system 204, or similar device of a user 206 or client. Alternatively, or in addition to the user and avatar specific content module 202 on the user's computer system 204 or client, the system 200 may include a module for generating user and avatar specific content in a virtual world 208 operable on a server 210 (hereinafter "server user and avatar specific content module") and accessible by the user 206 or client 204 via a network 212. The method 100 may be embodied in or performed by the user and avatar specific content module 202 and/or the server user and avatar specific content module 208. For example, the method 100 may be performed by the user and avatar specific content module 202. In another embodiment of the invention, the method 100 may be performed by the server user and avatar specific content module 208. In a further embodiment of the present invention, some of the features or functions of the method 100 may be performed by the user and avatar specific content module 202 on the user's computer system 204 and other features or functions of the method 100 may be performed on the server user and avatar specific content module 208.

A virtual world simulation system 214 may be operable on the server 210 and may be accessible by a plurality of users 206 or participants using an Internet browser on their respective computer systems 204 or clients. The virtual world simulation system 214 may also be operable on another server separate from the server 210 on which the user and avatar specific content module 208 is operable. The virtual world simulation may be Second Life™ or a similar virtual world system. The user and avatar specific content modules 202 and 208 may be part of the virtual world simulation system 214 or may be separate applications or modules that interface with the virtual world simulation. The network 212 may be the Internet, a private network or other network. Each computer system 204 may be similar to the exemplary computer system 204 and associated components illustrated in FIG. 2.

The user and avatar specific content module 202 and/or 208 may be a self contained system with embedded logic, decision making, state based operations and other functions that may operate in conjunction with a virtual world simulation, such as Second Life™. The self contained system may allow businesses, individuals, services, locations, and the like in the virtual world to interact.

The user and avatar specific content module 202 may be stored on a file system 216 or memory of the computer system 204. The user and avatar specific content module 202 may be accessed from the file system 216 and run on a processor 218 associated with the computer system 204.

The user and avatar specific content module 202 may include a module to define, create and/or retrieve attributes 220. The module to define, create and/or retrieve attributes 220 allows the user to input various attributes regarding the user and/or the user's avatar into the computer system 204. The module for defining, creating and/or retrieving attributes 220 may be accessed or activated whenever the user desires to input information and may call other modules such as the LAO module 222 to generate the local attribute object 223 or GUIs 240 as described below. The module for defining, creating and/or retrieving attributes 220 also allows input of the user's avatar attributes by any virtual world entity based on the avatar's actions, by any software communicative with the virtual world system that may observe and/or analyze the actions of the user's avatar and/or by any other entity that may obtain at least one attribute of the user and/or the user's avatar.

The user and avatar specific content module 202 may also include the LAO module 222 to generate a local attribute object 223. The local attribute object (LAO) 223 may be comprised of any user and/or user's avatar attributes. As previously described with respect to block 102 of FIG. 1, a user and/or user's avatar attribute may include at least one characteristic, quality, feature or any other aspect associated with the user and/or user's avatar, such as basic attributes, demographic attributes, situational attributes, geographic location attributes and other similar information. The attributes may be dynamic or static in nature. After the attributes of the user and/or user's avatar have been defined, as described above with reference to the module for defining attributes 220, the attributes may be stored on the computer system 204 or remotely on the server 210. The LAO 223 may reside on the user's computer system 204 as illustrated in FIG. 2, on the server 210, or at a database 225 or some other storage means on the network 212 as also illustrated in FIG. 2. The LAO 223 generated by module 222 may be accessed, queried and/or distributed at any time remotely by the server 210 or locally by the computer system 204.

The user computer system 204 may also include a display 230 and a speaker 232 or speaker system. The display 230 may present the virtual world and the user's avatar as described herein and may permit control of the user's avatar. Any GUIs 240 associated with the specific content modules 202 and 208 and avatar attributes may also be presented on the display 230. The speaker 232 may present any voice or other auditory signals or information to the user 206.

The user computer system 204 may also include one or more input devices, output devices or combination input and output device, collectively I/O devices 234. The I/O devices 234 may include a keyboard, computer pointing device or similar means to control operation of avatars and the automated avatar creation and interaction features described herein. The I/O devices 234 may also include disk drives or devices for reading computer media including computer-readable or computer-operable instructions.

The server user and avatar specific content module 208 may include a local service component (LSC) 248. The LSC 248 enables interactions between the LAO 223 and a virtual world operator. The LSC 248 may create, retrieve or update the LAO 223 information so that further interaction may occur between the virtual world operator and the LAO 223.

The server user and avatar specific content module 208 may include an access module 236. The access module 236 identifies triggers that allow a service provider to access the user and/or user's avatar's LAO 223. Triggers, or triggering events, may include, but are not limited to, an avatar's proximity to the service provider's virtual world space and authorization of the service provider to access the LAO 223 by the user/avatar.

The access module 236 may determine when the user's avatar comes within a predefined proximity area or range of the service provider's virtual world space, as previously discussed with respect to block 108 of FIG. 1. When the user's avatar comes within the predefined proximity area or range, the access module 236 may generate an alert within the server user and avatar specific content module 208 to determine or query the LAO 223 for attributes of the user and/or the user's avatar, as previously discussed with regard to block 108 of FIG. 1. The determination or query may take place via the local service component (LSC) 248, which may create, retrieve or update LAO information associated with the user and/or the user's avatar.

The access module 236 may, in another embodiment, determine if the service provider is authorized to access the LAO 223. Authorization may be defined by the user and/or the user's avatar as a list of look up parameters. Determination of whether there is a match between the service provider and the list of parameters defining authorized service providers may occur in a module to manage matching 244. As described above, authorized access may allow the service provider to determine or query the LAO 223 via the LSC 248 for attributes of the user and/or the user's avatar.

It is understood that a determination or query of the LAO 223 via the LSC 248 may be initiated at any time after a triggering event by the access module 236, the module to manage matching 244, the user and avatar specific content determination module 238, or by any other module.

The server user and avatar specific content module 208 may also include the module to manage matching 244 of the LAO 223 of the user and/or user's avatar with content parameters in a "look up" format (hereinafter "module to manage matching" 244). The look up parameters for determining content may include one or more lists of defined configurations of content correlated with the attributes and configurations thereof that serve to trigger specific content. The look up of content parameters may be stored locally on the user's computer 204 or the user's computer readable storage medium in a database (not shown). The look up parameters for determining content may also be stored remotely on the network 212 in a database, such as database 225.

The module to manage matching 244 may determine what constitutes a match and may determine that certain attributes are assigned a higher weight than other attributes for matching purposes. The module to manage matching 244 may determine which, and how many, LAO attributes of the user and/or user's avatar must match the content look up parameters to trigger the creation of a specific content. By matching a specified number of user and/or user avatar LAO attributes to content parameters defined by the service provider, the module to manage matching 244 may determine whether a match exists between a content available in the look up parameters and the LAO attributes of the user's avatar. If the module to manage matching 244 determines that a match exists between the attributes of the user and/or user's avatar in the LAO 223 and the content look up parameters, the module to manage matching 244 may select the matched look up content parameters and send an alert message to the module for determining user and avatar specific content 238 indicating the matched content parameter(s). The module to manage matching 244 may also send the matched content look up parameters to any other modules on the server user and avatar specific content module 208.

The module to manage matching 244 may determine whether the user and/or user's avatar's geographic location matches the default geographic location in the LAO, as discussed above for boxes 104 and 106 of FIG. 1. If there is not a match between the user and/or user's avatar's geographic location and the default location, the user may be notified by presentation of a GUI 240 to allow the user to configure location identification information. The module to manage matching 244 may determine whether a service provider has been authorized to access a user's and/or user's avatar's LAO, as described above for boxes 104 and 106 of FIG. 1. Such determination may occur by matching a service provider's query to a look up list of authorized service providers defined by the user and/or user's avatar.

The server user and avatar specific content module 208 may also include a module 238 for determining the specific content based on the LAO 223 attributes associated with the user and/or user's avatar (hereinafter "user and avatar specific content determination module" 238). The user and avatar specific content determination module 238 may include look up parameters for determining content, and/or may receive lists of LAO 223 attributes matched to look up parameters. The user and avatar specific content determination module 238 may receive an alert message from the module to manage matching 244, providing information on matches identified. The user and avatar specific content determination module 238 may then apply logic and decision making functions to the matches in determining what the user and avatar specific content will be. The results of the decision making may then be forwarded to a module to create the user and avatar specific content 246.

The server user and avatar specific content module 208 may also include a module for management of user and avatar specific content 250. The module for management of user and avatar specific content 250 may perform various tasks with respect to the specific content generated and presented by the virtual world operator, as described in boxes 110 and 112 of FIG. 1. The tasks performed by the module for management of user and avatar specific content 250 may include managing queries used to retrieve information from the LAO 223, managing logic functions within the LSC 248 for decision making purposes, managing and defining configuration of attributes required for delivery of content to a service provider's space, and other functions which may be appropriate for managing the generation of user and avatar specific content. The module for management of user and avatar specific content 250 may access any other modules in module 208.

The server user and avatar specific content module 208 may further include GUIs 240. The server user and avatar specific content module 208 may present one or more predetermined GUIs 240 to permit the user to define attributes associated with the user's avatar or any other information and/or settings. The GUIs 240 may be predetermined and/or presented in response to the user indicating the user would like to enter information and/or settings. The predetermined GUIs 240 may be generated by the server user and avatar specific content module 208 and may be presented on the display 230 of the computer system 204. The GUIs 240 may also include GUIs that permit a virtual world system operator or owner to manage user and avatar specific content, such as predefining types of specific content, managing and/or controlling specific content, creating specific content, managing the inventory of specific content, predefining the proximity area, as well as any other functions or features associated with user and avatar specific content.

Figure 3:
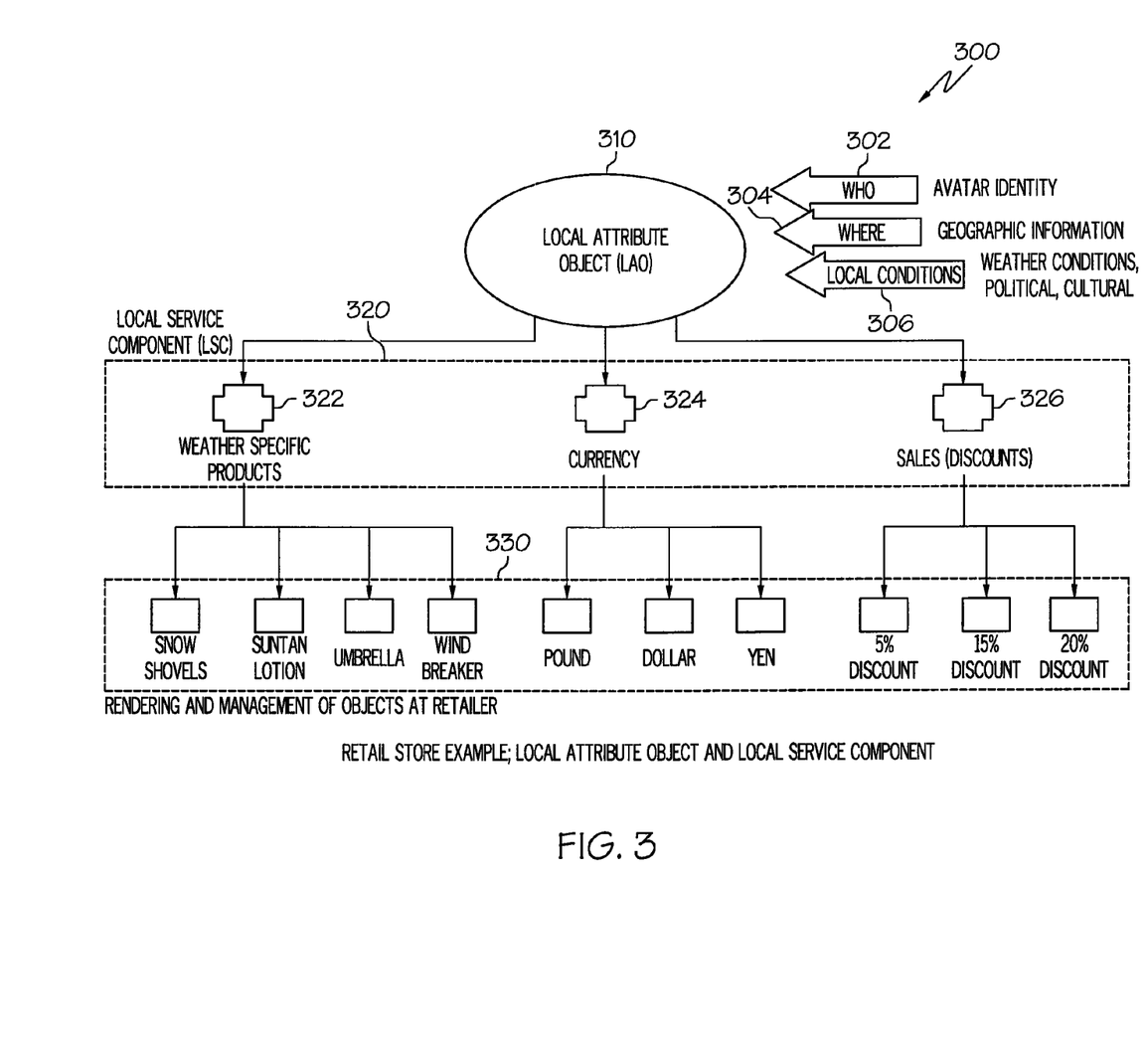
FIG. 3 is a diagram illustrating an example of a local attribute object and a local service component for generating user and avatar specific content in a virtual world in accordance with an aspect of the present invention, wherein the exemplary virtual world space is a retail store.

FIG. 3 is a diagram illustrating an example of a local attribute object 310, local service component 320 for generating user and avatar specific content or output 330 in a virtual world 300 in accordance with an aspect of the present invention, wherein the exemplary virtual world space is a retail store. Avatar identity information 302, geographic location information 304, and information regarding local conditions 306 may be received by the LAO 310. Avatar identity information 302 may include attributes such as those discussed with reference to block 102 in FIG. 1 and block 220 in FIG. 2. Geographic location information 304 may include attributes such as those discussed with reference to block 102 in FIG. 1 and block 220 in FIG. 2. Information regarding local conditions 306 may include attributes such as weather conditions, political environment, cultural environment, etc.

A virtual world retailer may access the LAO 310 by way of the retailer-defined LSC 320. The LSC 320 may comprise look up parameters that receive LAO attribute information as input and correlate the input with particular types of content to offer within the virtual retail store environment. The content offerings, or output, may take the form of products, services and/or environmental characteristics. The products may be items such as products appropriate for local weather conditions, locally made products, and local sports team products. The services may be, for example, tickets to locally offered activities or meals at local restaurants, The environmental characteristics may include characteristics such as, but not limited to, type of currency used in the store, language used in the store, and sales discounts offered throughout the store or in subsections thereof.

Once the retailer has accessed the LAO 310 by way of the LSC 320, the logic and decision making functions of the LSC 320 will serve to define what the specific content 330 will be. The specific content products as depicted in block 330 of FIG. 3 may include weather specific products 322 such as snow shovels, suntan lotion, umbrellas, and/or windbreaker jackets. Environmental characteristics content may include an assignment of type of currency 324 to use, such as the pound, dollar, or yen. Additionally, the LSC 320 may assign a sales discount 326 of 5%, 15%, or 20% or any other percentage amount to some or all of the items offered in the store.

Once the content has been configured in the retail store, the user/avatar will experience the content in the store environment. If the content comprises items, they may be presented in such a way that the user/avatar can manipulate the items in three dimensions.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of creating specific content in a virtual world for presentation to an avatar of a user, the method comprising:
   generating, by a computer, a local attribute object comprising a set of attributes of at least one of the user and the avatar of the user and a set of geographic location attributes identifying at least one of a real world location of the user and a virtual world location of the avatar of the user;
   allowing, by the computer, access to the local attribute object by a service provider in response to the avatar of the user entering a virtual world space of the service provider, wherein the service provider is a virtual retailer; and
   presenting, by the computer, to the avatar of the user specific content based on the local attribute object, the specific content including at least one of products and services provided by the service provider for purchase by at least one of the user and the avatar of the user, wherein presenting the specific content comprises determining by a local service component using the local attribute object the specific content to be presented to the avatar of the user, wherein the local service component creates, retrieves, updates, or any combination thereof, information in the local attribute object, and wherein the local service component comprises parameters that receive local attribute object information as input and correlate the input with particular types of specific content to present to the avatar of the user.

2. The method of claim 1, wherein allowing access to the local attribute object by the service provider comprises allowing access to the local attribute object by the local service component associated with the service provider in response to the user authorizing access by the service provider to the local attribute object.

3. The method of claim 1, further comprising updating the local attribute object in response to a triggering event.

4. The method according to claim 3, wherein updating the local attribute object comprises generating a query by the local attribute object to dynamically update attributes upon occurrence of the triggering event.

5. The method according to claim 3, wherein the triggering event comprises at least one of the user logging into the virtual world, the user requesting to update the local attribute object, and the service provider requesting access to the local attribute object.

6. The method according to claim 3, wherein updating the local attribute object comprises receiving information from at least one of the user's internet protocol address, a global positioning system, a triangulation location unit of a wireless communications device, a weather station, a schedule of events, a calendar, and a clock.

7. The method according to claim 1, further comprising allowing the user to configure the local attribute object to include default location information.

8. The method according to claim 7, further comprising:
comparing the geographic location attributes to the default location information; and
notifying the user in response to a mismatch between the geographic location attributes and the default location information.

9. The method according to claim 1, further comprising presenting a GUI to the user to authorize access to the local attribute object by defining types of virtual world operators that are allowed access to the local attribute object associated with the user.

10. The method according to claim 9, further comprising defining the types of virtual world operators by at least one of a service provider virtual world location, a service provider name, and a service provider type.

11. The method according to claim 1, further comprising presenting a GUI to the service provider so that the service provider can define at least one attribute that triggers the specific content.

12. The method according to claim 11, further comprising allowing selection of the at least one attribute from the group including zip code, city, county, state, region, country, internet protocol location, global positioning system coordinates, and coordinates from a triangulation location unit of a wireless communications device.

13. The method according to claim 1, wherein presenting the specific content to the avatar of the user comprises presenting environmental characteristics of the service provider's virtual world space.

14. The method according to claim 13, wherein presenting the environmental characteristics comprises presenting at least one of currency, language, discount pricing, and a configuration of the virtual world space.

15. The method according to claim 14, further comprising dynamically adjusting the configuration of the virtual world space based on a set of predetermined parameters.

16. The method according to claim 15, wherein the set of predetermined parameters is based on a number of avatars present in the virtual world space.

17. The method according to claim 13, wherein presenting the specific content to the avatar of the user comprises presenting an item that the avatar of the user can manipulate.

18. The method of claim 1, further comprising permitting the avatar of the user to perform an action relative to the specific content.

19. The method according to claim 18, wherein permitting the avatar of the user to perform the action comprises permitting the avatar of the user to purchase a product associated with the specific content.

20. A system for creating specific content in a virtual world for presentation to an avatar of a user, comprising:
a computer processor; and
a module for generating a local attribute object operable on the computer processor comprising a set of attributes of at least one of the user and the avatar of the user and a set of geographic location attributes identifying at least one of a real world location of the user and a virtual world location of the avatar of the user, wherein the module allows access to the local attribute object by a service provider in response to the avatar of the user entering a virtual world space of the service provider, wherein the service provider is a virtual retailer,
wherein the module presents to the avatar of the user specific content based on the local attribute object, wherein the specific content comprises at least one of products and services provided by the service provider for purchase by at least one of the user and the avatar of the user, wherein presenting the specific content comprises determining by a local service component using the local attribute object the specific content to be presented to the avatar of the user, wherein the local service component creates, retrieves, updates, or any combination thereof, information in the local attribute object, and wherein the local service component comprises parameters that receive local attribute object information as input and correlate the input with particular types of specific content to present to the avatar of the user.

21. A computer program product for creating specific content in a virtual world for presentation to an avatar of a user, comprising:
a non-signal propagating computer usable storage medium having computer usable program code embodied therein, the computer usable storage medium comprising:
computer usable program code configured to generate a local attribute object comprising a set of attributes of at least one of the user and the avatar of the user and a set of geographic location attributes identifying at least one of a real world location of the user and a virtual world location of the avatar of the user;
computer usable program code configured to allow access to the local attribute object by a service provider in response to the avatar of the user entering a virtual world space of the service provider, wherein the service provider is a virtual world retailer; and
computer usable program code configured to present to the avatar of the user specific content based on the local attribute object, wherein the specific content comprises at least one of products and services provided by the service provider for purchase by at least one of the user and the avatar of the user, wherein presenting the specific content comprises determining by a local service component using the local attribute object the specific content to be presented to the avatar of the user, wherein the local service component creates, retrieves, updates, or any combination thereof, information in the local attribute object, and wherein the local service component comprises parameters that receive local attribute object information as input and correlate the input with particular types of specific content to present to the avatar of the user.

* * * * *